United States Patent [19]

Kaneko

[11] Patent Number: 5,295,357
[45] Date of Patent: Mar. 22, 1994

[54] METHOD FOR LUBRICATING COMPRESSION TYPE REFRIGERATING SYSTEM

[75] Inventor: Masato Kaneko, Ichihara, Japan

[73] Assignee: Idemitsu Kosan Co, Ltd., Tokyo, Japan

[21] Appl. No.: 945,924

[22] Filed: Sep. 17, 1992

[30] Foreign Application Priority Data

Oct. 31, 1991 [JP] Japan .................. 3-286810
Nov. 25, 1991 [JP] Japan .................. 3-308137

[51] Int. Cl.$^5$ .............................. C09K 5/04
[52] U.S. Cl. .......................... 62/84; 62/114; 252/67; 252/68
[58] Field of Search ............ 62/84, 114; 252/67, 252/68

[56] References Cited

U.S. PATENT DOCUMENTS

| | | | |
|---|---|---|---|
| 4,755,316 | 7/1988 | Magid et al. | 62/114 X |
| 4,957,652 | 9/1990 | Tamura et al. | 62/114 X |
| 4,975,212 | 12/1990 | Thomas et al. | 252/68 X |
| 4,983,312 | 1/1991 | Tamura et al. | 62/114 X |
| 5,032,305 | 7/1991 | Kamakura et al. | 252/68 X |
| 5,059,338 | 10/1991 | Yoshida et al. | 62/114 X |
| 5,087,381 | 2/1992 | Tamura et al. | 62/114 X |
| 5,094,768 | 3/1992 | Jolley | 252/68 X |
| 5,154,846 | 10/1992 | Thomas et al. | 252/68 |
| 5,158,698 | 10/1992 | Jolley et al. | 252/68 |
| 5,198,139 | 3/1993 | Bierschenk et al. | 62/114 X |

*Primary Examiner*—Henry A. Bennet
*Assistant Examiner*—Christopher B. Kilner
*Attorney, Agent, or Firm*—Antonelli, Terry, Stout & Kraus

[57] ABSTRACT

A method of lubricating a compression type refrigerating system comprising a compressor, a condensor, an expansion valve or a capillary tube and an evaporator, involves the use of lubricants having a kinematic viscosity of 5 to 500 cSt at 40° C. and an interfacial tension of 8 dyne/cm or above in combination with a mixed refrigerant comprising 1,1,1,2-tetrafluoroethane and 1,1-dichloro-2,2,2-trifluoroethane or chlorodifluoromethane as an essential component in the system.

10 Claims, No Drawings

METHOD FOR LUBRICATING COMPRESSION TYPE REFRIGERATING SYSTEM

BACKGROUND OF THE INVENTION

1. Field of the Invention

The present invention relates to a method for lubricating a compression type refrigerating system. More particularly, it relates to a method for lubricating a compression type refrigerating system efficiently without detracting wear resistance, cooling effect and stability by employing a mixed refrigerant comprising 1,1,1,2-tetrafluoroethane (R-134a) and 1,1-dichloro-2,2,2-trifluoroethane (R-123) as the essential component or a mixed refrigerant comprising 1,1,1,2-tetrafluoroethane (R-134a) and chlorodifluoromethane (R-22) as the essential component in combination with either or both of a specific hydrocarbon compound and polyglycol as the lubricant.

2. Description of the Related Arts

Conventionally, in a compression type refrigerating system or cycle comprising a compressor, a condenser, an expansion valve or a capillary tube and an evaporator, a fluorinated hydrocarbon compound such as dichlorodifluoromethane (R-12) has been used as the refrigerant. Many lubricants compatible with the refrigerant have also been made industrially available for use.

However, there have been misgivings that these fluorinated hydrocarbon compounds (hereinafter referred sometimes to as "flon compound") conventionally used as the refrigerant are liable to cause depletion of the ozone layer after they are released into the open air. Throughout the world, so-called substitute flon refrigerants have come into the use, replacing these fluorinated hydrocarbon compounds. The replacement has been realized by the development and marketing of refrigerants comprising substitute flon compounds such as 1,1,1,2-tetrafluoroethane (R-134a), 1,1,2,2-tetrafluoroethane (R-134b), 1,1-dichloro-2,2,2-trifluoroethane (R-123), 1-chloro-1,1-difluoroethane (R-142b) and 1,1-dichloro-1-fluoroethane (R-141b).

Of these substitute flon refrigerants (flon refrigerants), the present trend has been such that the use of R-134a is encouraged to replace conventional R-12 or R-22.

Generally, the substitute flon refrigerants are different from conventional flon refrigerants in characteristics in that they have poor miscibility with mineral oils which have been used chiefly in combination with the conventional flon refrigerants. Thus, synthetic oils such as polyalkylene glycol compound (PAG) or ester compound have been developed and come into use as the suitable lubricant for these substitute flon refrigerants (U.S. Pat. No. 4,755,316 and Japanese Patent Application Laid-Open No. 33193/1991).

However, even for these synthetic oils, certain problems have awaited the solution with respect to the substitute flon refrigerants. PAGs or esters have a good miscibility with R-134a, a substitute flon refrigerant but not a sufficiently high stability.

Some hydrocarbon compounds such as mineral oil have a high stability to R-134a but are not miscible well with this substitute flon. A lubricant capable of satisfying the requirement both of miscibility and stability has been found hard to obtain.

Furthermore, R-134a has a high vapor pressure and thus can be used singly in compression type refrigerating systems. But R-123 having a low vapor pressure cannot be used singly elsewhere but for turbo type refrigerators and further something is missing in R-123 with respect to wear resistance, cooling effect and the like.

The present inventor has made intensive studies with methods for lubricating compression type refrigerating systems by using R-134a which is better than other substitute flon refrigerants.

As the result, it has been found that the compression type refrigerating systems can be efficiently lubricated by means of the simultaneous use of R-134a and another substitute flon refrigerant or a conventional flon refrigerant in combination with a specific lubricant.

SUMMARY OF THE INVENTION

An object of the present invention is to provide a method for efficiently lubricating a compression type refrigerating system without detracting the wear resistance, the cooling effect and the stability by simultaneously using two substitute flon refrigerants or a substitute flon refrigerant and a conventional flon refrigerant in combination with a lubricant having specific properties and thus realizing a compatibility that has never been existent between said substitute flon refrigerant and lubricant.

Therefore, the present invention provides a method for lubricating a compression type refrigerating system comprising a compressor, a condenser, an expansion valve or a capillary tube and an evaporator, which method comprises using a mixed refrigerant comprising 1,1,1,2-tetrafluoroethane and 1,1-dichloro-2,2,2-trifluoroethane as the essential component, in combination with a hydrocarbon compound as the lubricant having a kinematic viscosity of 5 to 500 cSt at 40° C. and an interfacial tension of 20 dyne/cm or above.

The present invention also provides a method for lubricating a compression type refrigerating system comprising a compressor, a condenser, an expansion valve or a capillary tube and an evaporator, which method comprises using a mixed refrigerant comprising 1,1,1,2-tetrafluoroethane and chlorodifluoromethane as the essential component, in combination with either or both of a hydrocarbon compound and a polyglycol as the lubricant each having a kinematic viscosity of 5 to 500 cSt at 40° C. and an interfacial tension of 8 dyne/cm or above.

DESCRIPTION OF PREFERRED EMBODIMENT

Usually a compression type refrigerating system comprises a compressor, a condenser, an expansion valve (or a capillary tube) and an evaporator. As the lubricant for such a refrigerator, a lubricant having a good miscibility with the refrigerant therein and a good stability is used.

However, if a substitute flon refrigerant is employed in said refrigerating system, accompanied by lubricating the refrigerator with a conventional lubricant, the wear resistance or the stability is not sufficient, thereby preventing the long lasting and stable operation of the refrigerating system. A marked tendency toward this has been seen particularly in refrigerating systems such as electric freezers and small size air-conditioners wherein capillary tubes are used as the expansion valve.

The present invention has been accomplished with a success of finding the solution in the foregoing problems.

First of all, the present invention comprises employing 1,1,1,2-tetrafluoroethane (R-134a) for the most part, associated with the simultaneous use of 1,1-dichloro-2,2,2-trifluoroethane (R-123) selected from other substitute flon refrigerants or chlorodifluoromethane (R-22) selected from conventional flon refrigerants.

With this composition, compression type refrigerating systems can efficiently be lubricated without exerting any adverse influences on the cooling efficiency by using the substitute flon refrigerant in combination with not only a synthetic oil but also a mineral oil as the lubricant.

In the present invention, when R-134a and R-123 are simultaneously used, the mixture ratio of both components is properly selected depending upon circumstances but ordinarily in a range of 40 to 95% by weight of R-134a and 60 to 5% by weight of R-123, preferably 50 to 85% by weight of R-134a and 50 to 15% by weight of R-123. When R-134a accounts for less than 40% by weight in this mixture ratio, the mixed refrigerant has a low vapor pressure and the refrigerator is susceptible to a decline of the cooling efficiency. When R-134a accounts for more than 95% by weight, the refrigerant and the lubricant are liable to be separated into two layers, undesirably causing the cooling efficiency to reduce.

Meanwhile, the mixed refrigerant comprising R-134a and R-123 can be mixed with 30% by weight or less of at least one refrigerant selected from the first group and the second group each consisting of:

First group:
1,3-dichloro-1,1,2,2,3-pentafluoropropane (R-225cb)
1,1-dichloro-2,2,3,3,3-pentafluoropropane (R-225ca)
1,1-dichlorotrifluoroethane (R-141b)
1-chloro-1,1-difluoroethane (R-142b)
chlorotetrafluoroethane (R-124)

Second group:
Difluoroethane (R-152a)
Chlorodifluoromethane (R-22)
Pentafluoroethane (R-125)
Trifluoroethane (R-143a)
Difluoromethane (R-32)
Trifluoromethane (R-23)

The refrigerants of the first group are effective in improving the solubility of lubricants and those of the second group in elevating the vapor pressure.

Furthermore, the mixed refrigerant of the present invention can comprise 1,1,1,2-tetrafluoroethane (R-134a) as the substitute flon refrigerant with the simultaneous use of chlorodifluoromethane (R-22). With this composition, the refrigerating systems can efficiently be lubricated without exerting any adverse influences on the cooling efficiency by using the substitute flon refrigerant in combination with not only a synthetic oil but also a mineral oil as the lubricant.

In the present invention, when R-22 and R-134a are simultaneously used, the mixture ratio of both components is properly selected depending upon circumstances but ordinarily in a range of 30 to 95% by weight of R-22 and 70 to 5% by weight of R-134a, preferably 50 to 90% by weight of R-22 and 50 to 10% by weight of R-134a. When R-22 accounts for less than 30% by weight in this mixture ratio, the mixed refrigerant has a low vapor pressure to cause a decline of the cooling efficiency and is liable to be separated into two layers undesirably. When R-22 accounts for more than 95% by weight, the mixed refrigerant has a low stability undesirably.

Meanwhile, the mixed refrigerant comprising R-134a and R-22 can be mixed with 1 to 30% by weight of at least one compound selected from said first and second groups of refrigerants as the third component.

On the other hand, examples of the lubricant include a hydrocarbon compound or a polyglycol each having a kinematic viscosity of 5 to 500 cSt, preferably 10 to 300 cSt at 40° C. and on top of this kinematic viscosity a interfacial tension (JIS-K-2241) of 8 dyne/cm or above, preferably 10 dyne/cm or above. When the hydrocarbon compound or polyglycol having a kinematic viscosity of below 5 cSt at 40° C. is used the lubricity is declined. When that of above 500 cSt is used, the refrigerant and the lubricant are liable to be separated into two layers, undesirably resulting in the unsatisfactory stability and the deteriorated return of oils. Furthermore, when the lubricant has an interfacial tension of below 8 dyne/cm, it is too hygroscopic and unstable to be used. Particularly, in the case of the mixed refrigerant comprising R-134a and R-123, it is appropriate to use a hydrocarbon compound having a kinematic viscosity of 5 to 500 cSt, preferably 10 to 300 cSt at 40° C. and on top of this kinematic viscosity an interfacial tension (JIS-K-2241) of 20 dyne/cm or above, preferably 25 dyne/cm or above.

Various lubricants having these properties can be used in the present invention. One of their specific examples is a mineral oil comprising a hydrocarbon compound such as paraffinic mineral oil, naphthenic mineral oil, aromatic mineral oil and intermediate base mineral oil.

Another is a synthetic lubricating oil comprising a hydrocarbon compound such as (co)polymer or oligomer derived from olefins having 2 to 16 carbon atoms, alkylbenzene and alkylnaphthalene.

Still another is a polyglycol such as polyalkylene glycol which can be subclassified into polypropylene glycol monomethylether, polypropylene glycol monobutylether, polypropylene glycol dimethylether and polypropylene glycol dipropylether.

These lubricants are used singly or in combination.

Moreover, various additives can be added to these lubricants. The additives include extreme pressure agent such as phosphoric ester and phosphorous ester, antioxidant, chlorine capturing agent, metal deactivator, defoaming agent, detergent-dispersant, viscosity index improver, antirust agent, corrosion inhibitor, pour point depressant and the like.

In the present invention, the mixed refrigerant comprising R-134a for the most part with the simultaneous use of R-123 can be used in combination with the lubricant at various mixture ratios but ordinarily at a ratio of 50 to 95% by weight of the substitute flon mixed refrigerant and 50 to 5% by weight of the lubricant. By using the substitute flon mixed refrigerant and the lubricant at said mixture ratio, both of them are made highly miscible each other, along with the improvement of the lubricity. When the lubricant is at too great a ratio, the refrigerant has a low vapor pressure, resulting in a risk of a decline of the cooling efficiency.

Furthermore, in the present invention, when the mixed refrigerant comprising R-134a and R-22 is employed, this mixed refrigerant and the lubricant can be used at various mixture ratios but ordinarily at a ratio of 50 to 95% by weight of the mixed refrigerant and 50 to 5% by weight of the lubricant. By using the mixed refrigerant and the lubricant at said mixture ratio, both of them are made highly miscible each other, along with the improvement of the lubricity. When the lubricant is at a ratio of less than 5% by weight, the lubricity is deteriorated. When it is at a ratio of more than 50% by weight, the refrigerant has a low vapor pressure, resulting in a risk of a decline of the cooling efficiency.

As evident from above, the refrigerating systems can efficiently be operated without detracting the wear resistance, the cooling effect and the stability by means of the simultaneous use of two substitute flon compounds, i.e. R-134a and R-123, in combination with the economically advantageous mineral oil and synthetic oil whose application is made possible by comprising the hydrocarbon compound having the kinematic viscosity of 5 to 500 cSt at 40° C. and the interfacial tension of 20 dyne/cm or above.

Furthermore, the refrigerating system can efficiently be operated without detracting the wear resistance, the cooling effect and the stability by means of the simultaneous use of a substitute flon refrigerant and a conventional flon refrigerant, i.e. R-134a and R-22, in combination with the economically advantageous mineral oil and synthetic oil whose application is made possible by comprising the hydrocarbon compound or polyglycol having the kinematic viscosity of 5 to 500 cSt at 40° C. and the interfacial tension of 8 dyne/cm or above.

Therefore, the method of present invention is effective for downsizing refrigerating equipment, having high industrial usefulness.

Now, the present invention will be described in greater detail with reference to the examples and the comparative examples.

At first, the description of the lubricants, the mixture ratios of the substitute flon mixed refrigerants and the like as used in the examples and the comparative examples are listed in Table 1, Table 2 and Table 3.

The interfacial tension and the hygroscopicity were determined as set forth below:

1) Interfacial tension
Determined according to JIS-K-2241.

2) Hygroscopicity
10 g of a lubricant was weighed out in a 50 cc beaker, allowed to stand for 2 days in a thermostat-hygrostat bath under the condition of a temperature of 25° C. and a humidity of 85% and thereafter the content of picked up moisture (% by weight) was determined.

TABLE 1

|  | Examples | | |
|---|---|---|---|
|  | Alben 1 | Alben 2 | Naphthene |
| Kinematic viscosity (40° C.)cSt | 37.81 | 58.02 | 29.43 |
| Kinematic Viscosity (100° C.)cSt | 4.679 | 5.893 | 4.351 |
| Visocisty index | −32 | −10 | 5 |
| % $C_A$ | — | — | 12.1 |
| % $C_N$ | — | — | 43.3 |
| % $C_P$ | — | — | 44.5 |
| Pour point (°C.) | −45 | −37.5 | −45 |
| Aniline point (°C.) | 62.6 | 67.8 | 76.2 |
| Sulfur content (ppm) | 5> | 5> | 260 |

|  | Example | Comparative Example | |
|---|---|---|---|
|  | Paraffin | PAG | Ester |
| Kinematic viscosity (40° C.)cSt | 36.95 | 46.93 | 71.97 |
| Kinematic Viscosity (100° C.)cSt | 5.640 | 9.15 | 10.04 |
| Visocisty index | 87 | 181 | 122 |
| % $C_A$ | 0.4 | — | — |
| % $C_N$ | 37.4 | — | — |
| % $C_P$ | 63.0 | — | — |
| Pour point (°C.) | −45 | −45 | −45 |
| Aniline point (°C.) | 108.8 | −20> | −20> |
| Sulfur content (ppm) | 5> | 5> | 5> |

Alben 1: Alkylbenzene (a mixture of monosubstituted brached alkylbenzene and disubstituted branched alkylbenezene)
Alben 2: Alkylbenzene (a mixture of monosubstituted branched alkylbenzene and disubstituted branched alkylbenzene)
PAG: Polypropylene glycol monobutylether
Ester: Dipentaerythritolhexahexanoate

TABLE 2

|  | Lubricant | | | | Substitute flon refrigerant | |
|---|---|---|---|---|---|---|
| No. | Kind | Viscosity cSt | Interfacial tension dyne/cm | Hygroscopicity wt % | R-134a | R-123 |
| Example 1 | Alben 1 | 37.8 | 52.4 | 0.01> | 7 | 3 |
| Example 2 | Alben 1 | 37.8 | 52.4 | 0.01> | 6 | 4 |
| Example 3 | Alben 1 | 37.8 | 52.4 | 0.01> | 5 | 5 |
| Example 4 | Alben 1 | 37.8 | 52.4 | 0.01> | 4 | 6 |
| Example 5 | Alben 2 | 58.0 | 52.7 | 0.01> | 5 | 5 |
| Example 6 | Naphthene | 29.4 | 38.2 | 0.01> | 5 | 5 |
| Example 7 | Paraffin | 36.9 | 35.2 | 0.01> | 5 | 5 |
| Comparative Example 1 | Alben 1 | 37.8 | — | — | 10 | 0 |
| Comparative Example 2 | Alben 1 | 37.8 | — | — | 0 | 10 |
| Comparative Example 3 | Alben 1 | 37.8 | — | — | 2 | 8 |
| Comparative Example 4 | Ester | 71.9 | 6.4 | 0.3 | 5 | 5 |

Viscosity: 40° C.
Substitute flon refrigerant: Ratio by weight

TABLE 3

|  | Lubricant | | | | Mixed refrigerant | |
|---|---|---|---|---|---|---|
| No. | Kind | Viscosity cSt | Interfacial tension dyne/cm | Hygroscopicity wt % | R-134a | R-123 |
| Example 8 | PAG | 42.6 | 11.5 | 2.3 | 5 | 5 |
| Example 9 | PAG | 42.6 | 11.5 | 2.3 | 6 | 4 |
| Example 10 | Alben 1 | 37.8 | 52.4 | 0.01> | 1 | 9 |
| Example 11 | Alben 1 | 37.8 | 52.4 | 0.01> | 2 | 8 |
| Example 12 | Alben 1 | 37.8 | 52.4 | 0.01> | 3 | 7 |

TABLE 3-continued

| No. | Lubricant | | | | Mixed refrigerant | |
|---|---|---|---|---|---|---|
| | Kind | Viscosity cSt | Interfacial tension dyne/cm | Hygroscopicity wt % | R-134a | R-123 |
| Example 13 | Alben 1 | 37.8 | 52.4 | 0.01> | 5 | 5 |
| Example 14 | Alben 2 | 58.0 | 52.7 | 0.01> | 2 | 8 |
| Example 15 | Alben 2 | 58.0 | 52.7 | 0.01> | 3 | 7 |
| Example 16 | Naphthene | 29.4 | 38.2 | 0.01> | 1 | 9 |
| Example 17 | Paraffin | 36.9 | 35.2 | 0.01> | 1 | 9 |
| Comparative Example 5 | PAG | 42.6 | 11.5 | 2.3 | 10 | 0 |
| Comparative Example 6 | PAG | 42.6 | 11.5 | 2.3 | 9 | 1 |
| Comparative Example 7 | Alben 1 | 37.8 | 52.4 | 0.01> | 10 | 0 |
| Comparative Example 8 | Naphthene | 29.4 | 38.2 | 0.01> | 10 | 0 |
| Comparative Example 9 | Paraffin | 36.9 | 35.2 | 0.01> | 10 | 0 |
| Comparative Example 10 | PAG | 42.6 | 11.5 | 2.3 | 0 | 10 |
| Comparative Example 11 | Ester | 71.9 | 6.4 | 0.3 | 5 | 5 |

Viscosity: 40° C., Mixed refrigerant: Ratio by weight

EXAMPLES 1 TO 7 AND COMPARATIVE EXAMPLES 1 TO 4

In these examples and comparative examples, the lubricants combined with the refrigerants at a ratio of 10/90 (ratio by weight) were examined by using a compression type refrigerating system comprising a compressor, a condenser, a capillary tube and an evaporator (with an output of 160 W). The results thereof are shown in Table 4.

EXAMPLES 8 TO 17 AND COMPARATIVE EXAMPLES 5 TO 11

In these examples and comparative examples, the lubricants combined with the refrigerants at a ratio of 10/90 (ratio by weight) were examined by using a compression type refrigerating system comprising a compressor, a condenser, a capillary tube and an evaporator (with an output of 160 W). The results thereof are shown in Table 5.

TABLE 4

| No. | Two layer separation temperature (°C.) at side of high temperature | Vapor pressure in presence of lub.-ref. mixture | Refrigerator cooling rate | Shield tube test | | Falex friction test (mg) |
|---|---|---|---|---|---|---|
| | | | | Outlook | Total acid No. | |
| Example 1 | 90< | 7.6 | 1.5 | Good | 0.1> | 5 |
| Example 2 | 90< | 6.9 | 1.2 | Good | 0.1> | 4 |
| Example 3 | 90< | 6.2 | 1.0 | Good | 0.1> | 4 |
| Example 4 | 90< | 5.4 | 0.9 | Good | 0.1> | 4 |
| Example 5 | 90< | 6.2 | 1.0 | Good | 0.1> | 3 |
| Example 6 | 90< | 6.3 | 1.0 | Good | 0.1> | 3 |
| Example 7 | 90< | 6.3 | 1.0 | Good | 0.1> | 4 |
| Comparative Example 1 | Separated | 9.2 | 2.0 | Good | 0.1> | 10 |
| Comparative Example 2 | 90< | 0.8 | 0.1> | Brown | 2.3 | 3 |
| Comparative Example 3 | 90< | 3.5 | 0.3 | Yellow | 0.5 | 8 |
| Comparative Example 4 | 90< | 6.2 | 1.0 | Black | 20.8 | 32 |

The vapor pressure in the presence of the lubricant-refrigerant mixture: kg/cm² abs

TABLE 5

| No. | Two layer separation temperature (°C.) at side of high temperature | Vapor pressure in presence of lub.-ref. mixture | Refrigerator cooling rate | Shield tube test | | Falex friction test (mg) |
|---|---|---|---|---|---|---|
| | | | | Outlook | Total acid No. | |
| Example 8 | 90< | 12.1 | 1.2 | Good | 0.1> | 4 |
| Example 9 | 90< | 11.7 | 1.1 | Good | 0.1> | 5 |
| Example 10 | 90< | 13.8 | 1.4 | Good | 0.1> | 3 |
| Example 11 | 90< | 13.6 | 1.4 | Good | 0.1> | 4 |
| Example 12 | 90< | 13.3 | 1.3 | Good | 0.1> | 4 |
| Example 13 | 90< | 12.3 | 1.2 | Good | 0.1> | 4 |
| Example 14 | 90< | 13.6 | 1.4 | Good | 0.1> | 3 |
| Example 15 | 90< | 13.3 | 1.3 | Good | 0.1> | 3 |
| Example 16 | 90< | 13.7 | 1.4 | Good | 0.1> | 3 |
| Example 17 | 90< | 13.9 | 1.4 | Good | 0.1> | 4 |
| Comparative Example 5 | 75 | 9.2 | 0.8 | Good | 0.1> | 20 |
| Comparative Example 6 | 85 | 9.7 | 0.9 | Good | 0.1> | 12 |

TABLE 5-continued

| No. | Two layer separation temperature (°C.) at side of high temperature | Vapor pressure in presence of lub.-ref. mixture | Refrigerator cooling rate | Shield tube test Outlook | Total acid No. | Falex friction test (mg) |
|---|---|---|---|---|---|---|
| Comparative Example 7 | Separated | 9.2 | 0.8 | Good | 0.1> | 15 |
| Comparative Example 8 | Separated | 9.3 | 0.8 | Good | 0.1> | 12 |
| Comparative Example 9 | Separated | 9.5 | 0.9 | Good | 0.1> | 14 |
| Comparative Example 10 | 90< | 14.0 | 1.4 | Brown | 3.6 | 4 |
| Comparative Example 11 | 90< | 12.0 | 1.2 | Black | 29.8 | 32 |

The vapor pressure in the presence of the lubricant-refrigerant mixture: $kg/cm^2$ abs Besides, the various functions were determined under the following conditions:

1) Determination of the two layer separation temperature

The mixture ratio of lubricants and refrigerants (% by weight) = 10/90

2) Determination of the vapor pressure in the presence of the mixture of lubricant and refrigerant The mixture ratio of lubricants and refrigerants (% by weight) = 10/90

At a temperature of 40° C.

3) Determination of the refrigerator cooling rate

Evaluated in terms of a relative cooling rate at which the temperature reached −20° C. in the freezer of the refrigerator having an output of 160 W.

4) Shield tube test

At 175° C. for 10 days, catalyst: Fe, Cu and Al refrigerant=1 g, lubricant=4 cc, water=1% by weight (in oil)

Test method:

After above test was over, the outlook was examined and the total acid number was determined with respect to a lubricant.

5) Falex friction test

10% by weight of a refrigerant was mixed and subjected to the friction under the condition of a number of revolution at 290 rpm, a load of 300 lb and an operating time of 60 minutes. A specification test sample was used in this test.

What is claimed is:

1. A method for lubricating a compression type refrigerating system comprising a compressor, a condensor, an expansion valve or a capillary tube and an evaporator, which method comprises using a mixed refrigerant comprising 40 to 95% by weight of 1,1,1,2-tetrafluoroethane and 60 to 5% by weight of 1,1-dichloro-2,2,2-trifluoroethane as the essential component, in combination with a hydrocarbon compound as a lubricant having a kinematic viscosity of 5 to 500 cSt at 40° C. and an interfacial tension of 20 dyne/cm or above in said system.

2. A method according to claim 1 wherein said lubricant is a mineral oil.

3. A method according to claim 1 wherein said lubricant is a synthetic oil.

4. A method according to claim 1 wherein said mixed refrigerant comprises 50 to 85% by weight of 1,1,1,2-tetrafluoroethane and 50 to 15% by weight of 1,1-dichloro-2,2,2-trifluoroethane.

5. A method for lubricating a compression type refrigerating system comprising a compressor, a condensor, an expansion valve or a capillary tube and an evaporator, which method comprises using a mixed refrigerant comprising 70 to 5% by weight of 1,1,1,2-tetrafluoroethane and 30 to 95% by weight of chlorodifluoromethane as the essential component, in combination with a hydrocarbon compound as a lubricant having a kinematic viscosity of 5 to 500 cSt at 40° C. and an interfacial tension of 8 dyne/cm or above in said system.

6. A method according to claim 5 wherein said lubricant is a mineral oil.

7. A method according to claim 5 wherein said lubricant is a synthetic oil.

8. A method according to claim 5 wherein said mixed refrigerant comprises 50 to 10% by weight of 1,1,1,2-tetrafluoroethane and 50 to 90% by weight of chlorodifluoromethane.

9. A method according to claim 1, wherein the mixed refrigerant and the lubricant are in combination in a ratio of 50 to 95% by weight of the mixed refrigerant and 50 to 5% by weight of the lubricant.

10. A method according to claim 5, wherein the mixed refrigerant and the lubricant are in combination in a ratio of 50 to 95% by weight of the mixed refrigerant and 50 to 5% by weight of the lubricant.

* * * * *